United States Patent [19]
Okuyama et al.

[11] Patent Number: 6,031,587
[45] Date of Patent: Feb. 29, 2000

[54] OPTICAL MEMBER, OPTICAL INSTRUMENT INCLUDING THE SAME, AND METHOD OF MANUFACTURING THE OPTICAL MEMBER

[75] Inventors: Atsushi Okuyama, Tokorozawa; Ken Wada, Yokohama, both of Japan

[73] Assignee: Canon Kabushiki Kaisha, Tokyo, Japan

[21] Appl. No.: 08/790,591

[22] Filed: Jan. 29, 1997

[30] Foreign Application Priority Data

Jan. 31, 1996 [JP] Japan ................................. 8-015336

[51] Int. Cl.⁷ .................................................. G02F 1/1335
[52] U.S. Cl. ............................................. 349/8; 349/9
[58] Field of Search ........................... 349/5, 8, 9; 359/583

[56] References Cited

U.S. PATENT DOCUMENTS

| | | | |
|---|---|---|---|
| 5,237,435 | 8/1993 | Kuramatsu et al. | 359/573 |
| 5,283,600 | 2/1994 | Imai | 349/9 |
| 5,381,278 | 1/1995 | Shingaki et al. | 349/9 |
| 5,387,953 | 2/1995 | Minoura et al. | 353/20 |
| 5,493,326 | 2/1996 | Andrews et al. | 347/257 |
| 5,729,306 | 3/1998 | Miyake et al. | 349/113 |

FOREIGN PATENT DOCUMENTS 4-290090  10/1992  Japan.

*Primary Examiner*—William L. Sikes
*Assistant Examiner*—Toan Ton
*Attorney, Agent, or Firm*—Fitzpatrick, Cella, Harper & Scinto

[57] ABSTRACT

An optical member used in a color composition system of an optical instrument, such as a projector, includes a prism member formed by joining a plurality of prisms, and a plurality of image forming units fixed to the prism member, wherein joint surfaces of the plurality of prisms reflect therefrom light of a predetermined wavelength range and pass therethrough the light other than that of the predetermined wavelength range, and wherein relative positions of the plurality of prisms are shifted along the joint surfaces to adjust optical path length of the light emitting from each of the image forming units and passing through the prism member, and thereafter the plurality of prisms are fixed.

9 Claims, 9 Drawing Sheets

OPTICAL MEMBER, OPTICAL INSTRUMENT INCLUDING THE SAME, AND METHOD OF MANUFACTURING THE OPTICAL MEMBER

BACKGROUND OF THE INVENTION

1. Field of the Invention

The present invention relates to an optical member, and more particularly to an optical member used in an optical instrument such as a projector which composes images formed by three liquid crystal panels, and enlarges and projects a composed image onto a screen.

2. Description of the Related Art

FIG. 1 schematically illustrates a main part of a conventional three-panel type projector.

Referring to FIG. 1, the projector is chiefly composed of a projection lens 101 and an illumination box 102. The illumination box 102 has a light source 103, dichroic mirrors 104 and 105 for color separation, dichroic mirrors 106 and 107 for color composition, reflecting mirrors 108 and 109, and liquid crystal panels 110, 111 and 112.

In the projector shown in FIG. 1, white light emitted from the light source 103 is separated into three colors, red, green, and blue, by the dichroic mirrors 104 and 105, and each color light illuminates liquid crystal panels 110, 111 and 112, respectively. Images of the three colors of red, green, and blue, respectively formed on the liquid crystal panels are composed by the dichroic mirrors 106 and 107, and the composed image is enlarged and projected onto a screen (not shown) by the projection lens 101.

In the above conventional projector, however, components are individually provided in the illumination box 102. Thus, because there may be some inaccuracy in mounting each component, each of the red, green, and blue color images may be displaced. That is, the mounting inaccuracies may cause errors movement and rotation of a focus. To correct for these inaccuracies, each image on the screen can be matched by fine adjustment of the positions of the liquid crystal panels 110 to 112. However, since the displacements of the images vary with a combination of mounting errors of the separate optical components, the adjustment becomes complicated and makes manufacturing the apparatus more difficult.

In addition, other factors, such as impact on the illumination box 102 and temperature changes cause a partial position error of each component, so that the adjusted images are disturbed again.

SUMMARY OF THE INVENTION

Accordingly, it is an object of the present invention to provide an optical member which improves workability when manufacturing an optical instrument such as a projector.

According to an aspect of the present invention, there is provided an optical member including a prism member formed by joining a plurality of prisms and a plurality of image forming units fixed to the prism member. In this aspect of the invention, joint surfaces of the plurality of prisms reflect therefrom light of a predetermined wavelength range, and pass therethrough the light other than that of the predetermined wavelength range. Also in this aspect, relative positions of the plurality of prisms are shifted along the joint surfaces to adjust an optical path length of the light emitting from the image forming units and passing through the prism member, and thereafter the plurality of prisms are fixed.

According to another aspect of the present invention, there is provided an optical instrument including a white light source, a color separation optical system for separating the light from the white light source into light of each predetermined wavelength range, a plurality of image forming units which are illuminated by each colored light separated by the color separation optical system, a color composition optical system for composing each light of the predetermined wavelength range emitted from the image forming units, and a projection optical system for projecting the light emitted from the color composition optical system. The color composition optical system includes a prism member to which the image forming units are fixed, and which is formed by joining end surfaces of a plurality of prisms. In this aspect of the invention, joint surfaces of the plurality of prisms reflect therefrom light of a predetermined wavelength range, and pass therethrough the light other than that of the predetermined wavelength range. Relative positions of the plurality of prisms are shifted along the joint surfaces to adjust an optical path length of the light emitting from the image forming units and passing through the prism member, and thereafter the plurality of prisms are fixed.

According to a further aspect of the present invention, there is provided a method of manufacturing an optical member. The method includes the steps of attaching a first image forming unit to a first prism, adjusting an optical path of the light emitting from the first image forming unit and passing through the first prism by rotating and/or shifting the first image forming unit on the first prism, and fixing the first image forming unit to the first prism. The method also includes the steps of attaching a second prism to the first prism, attaching a second image forming unit to the second prism, adjusting an optical path length of the light emitting from the second image forming unit and pass through the second prism and the first prism by shifting the second prism on the first prism, fixing the second prism to the first prism, adjusting an optical path of the light emitting from the second image forming unit and passing through the second prism and the first prism by rotating and/or shifting the second image forming unit on the second prism, and fixing the second image forming unit to the second prism.

DESCRIPTION OF THE PREFERRED EMBODIMENTS

Figure 1:
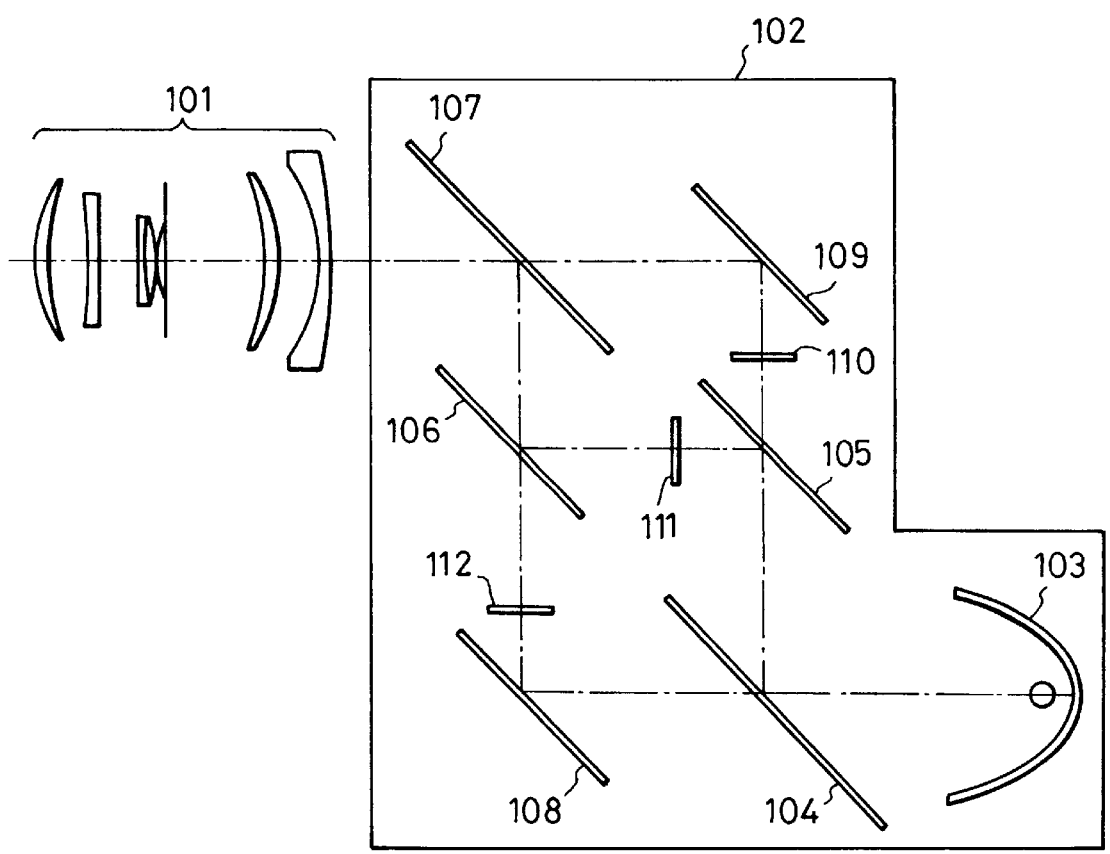
FIG. 1 schematically illustrates a conventional projector.
Figure 2:
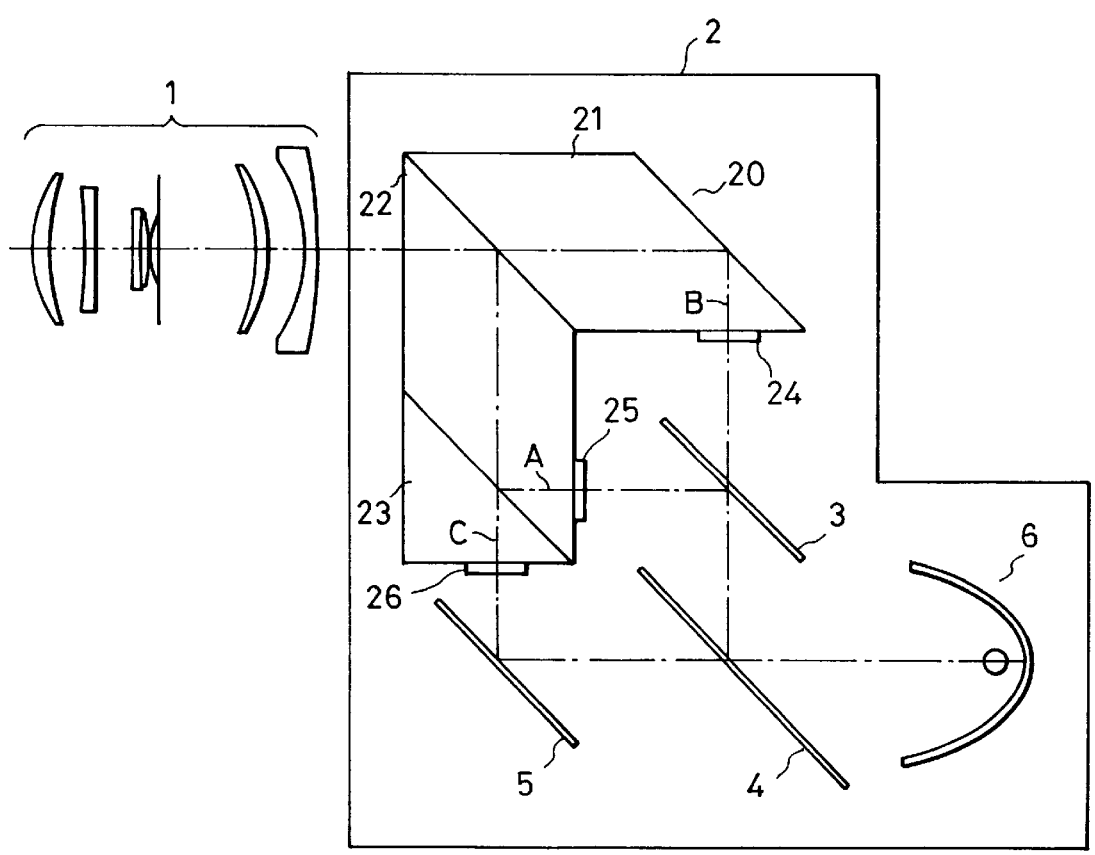
FIG. 2 schematically illustrates a main part of a projector using optical members of the present invention.

FIG. 2 schematically illustrates a main part of a projector using optical members of the present invention.

Referring to FIG. 2, there are provided a projection lens 1, an illumination box, dichroic mirrors 3 and 4 for color separation, a reflecting mirror 5, a light source 6 composed of a metal halide lamp and a reflecting mirror, a color composition prism 20 formed by joining prisms 21, 22 and 23, and liquid crystal panels 24, 25 and 26 displaying wavelength ranges of each of three colors of red, green and blue.

The color composition prism 20 includes dichroic films for composing colored light onto a joint surface between the prism 21 and the prism 22 and on a joint surface between the prism 22 and 23, respectively. Each of the liquid crystal panels 24 to 26 are fixed on surfaces of the color composition prism 20 other than to which the projection lens 1 is attached. An adhesive, such as an ultraviolet-curing adhesive is applied onto joint surfaces to fix the prisms 21 to 23 to the liquid crystal panels 24 to 26. An optical member of the present invention is composed of the color composition prism 20 and the liquid crystal panels 24 to 26.

Which liquid crystal panel should display an image of which wavelength range is not particularly defined because it depends on properties of the dichroic films formed on the joint surfaces between the dichroic mirrors 3 and 4, and between the prisms 21, 22, and 23.

Position adjustment of the liquid crystal panels 24 to 26 will now be described with reference to FIGS. 3 and 4.

Figure 3:
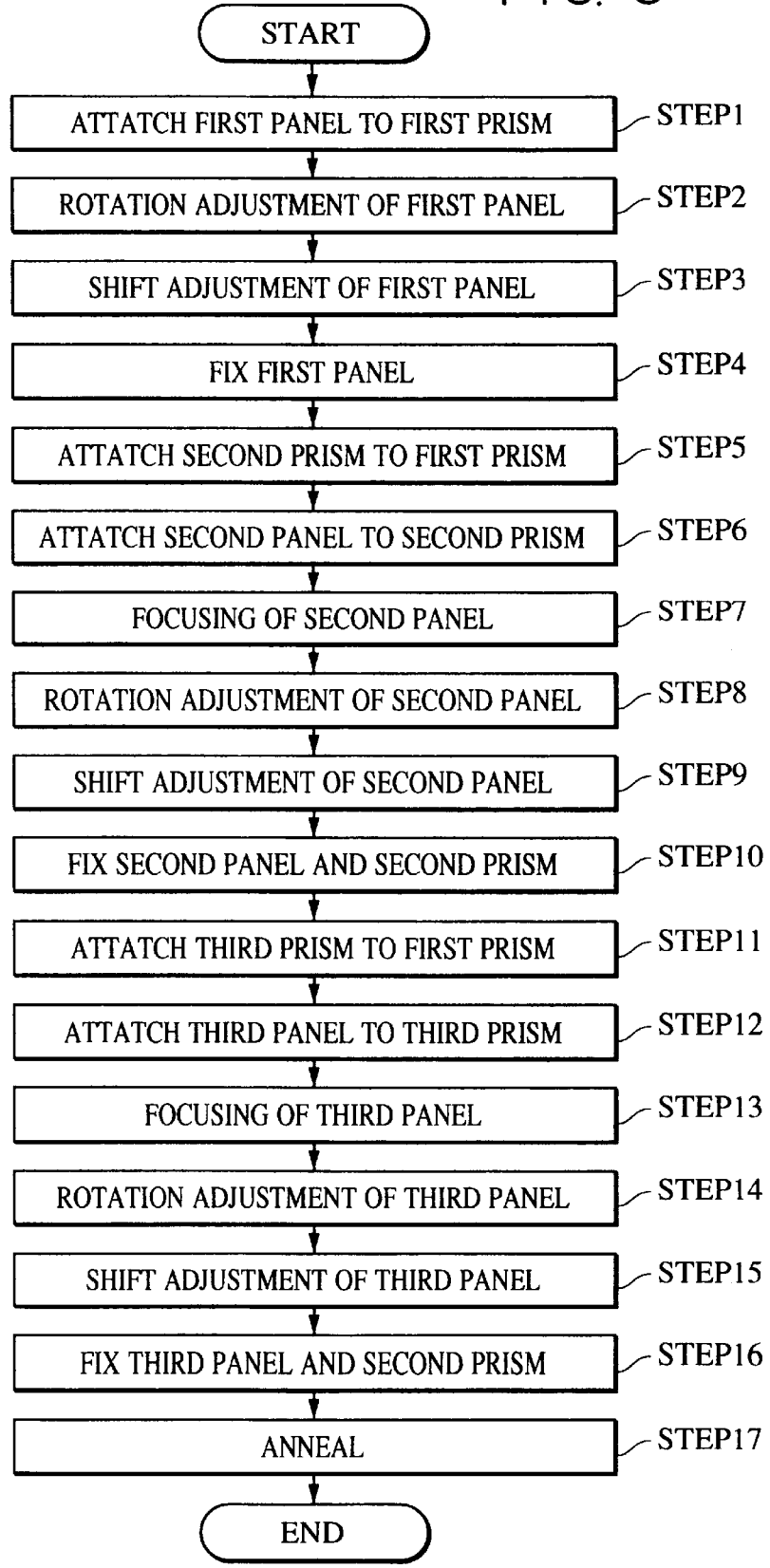
FIG. 3 is a flowchart showing the steps to adjust each liquid crystal panel.
Figure 4:
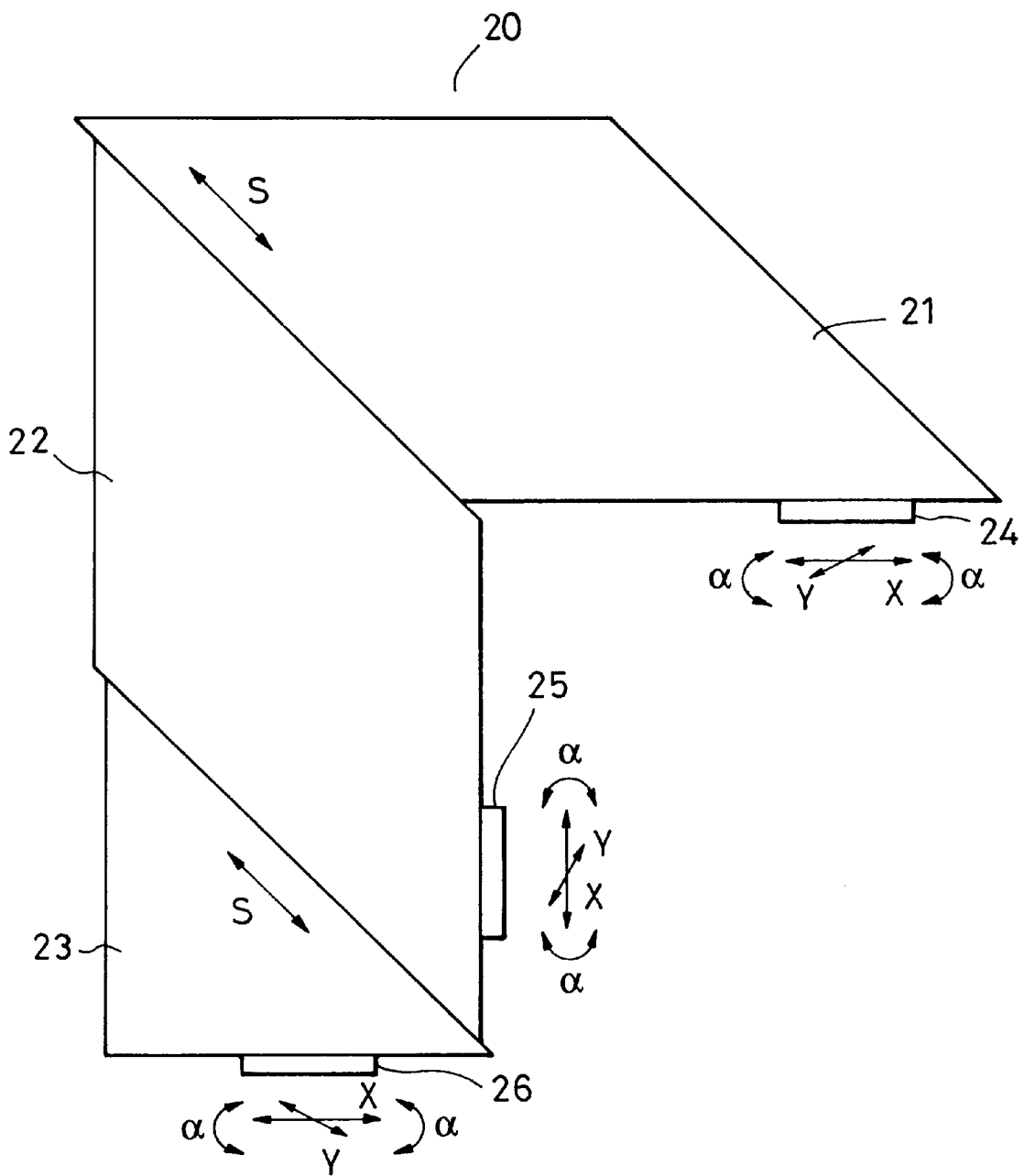
FIG. 4 illustrates a method of adjusting liquid crystal panels.

FIG. 3 is a flowchart showing the steps to adjust the position of each liquid crystal panel; and FIG. 4 illustrates how to adjust the position of each liquid crystal panel.

In STEP 1, a first panel (liquid crystal panel 25) is attached to an end face of a first prism prism 22) opposite the end face to which the projection lens is attached.

In STEP 2, the liquid crystal panel 25 is rotated on the end face to adjust its horizontal and vertical directions relative to a reference axis A. The rotation adjustment is performed by adjusting panel 25 in the directions represented by arrows α in FIG. 4 around axis A indicated by the long-and-short dashed line.

In STEP 3, the liquid crystal panel 25 is shifted on the end face to adjust its center to a reference position by adjusting in the X and Y directions represented by arrows X and Y in FIG. 4.

In STEP 4, the liquid crystal panel 25 is fixed to the prism 22. If the ultraviolet-curing adhesive is used, the joint surface between the liquid crystal panel 25 and the prism 22 is irradiated with ultraviolet rays.

In STEP 5, a second prism (prism 21) is attached to a predetermined end face of the prism 22 with adhesive.

In STEP 6, a second panel (liquid crystal panel 24) is attached to a predetermined end face of the prism 21 with adhesive.

In STEP 7, the prism 21 is slid along the joint surface between the prism 21 and the prism 22 to adjust the liquid crystal panel 24 to a predetermined focal position. The adjustment is performed by adjusting the prism in the directions represented by arrows S in FIG. 4.

In STEP 8, the liquid crystal panel 24 is rotated on the end face of prism 21 to adjust its horizontal and vertical directions relative to a reference axis B. This rotation adjustment is performed by adjusting panel 24 in the directions represented by arrows α in FIG. 4 around axis B indicated by the long-and-short dashed line.

In STEP 9, the liquid crystal panel 24 is shifted on the end face to adjust its center to a reference position by adjusting in the X and Y directions represented by arrows X and Y in FIG. 4.

In STEP 10, the liquid crystal panel 24 is fixed to the prism 21, and the prism 21 is fixed to the prism 22 using a method such as that described for step 4.

In STEP 11, a third prism (prism 23) is attached to a predetermined end face of the prism 22 with adhesive.

In STEP 12, a third panel (liquid crystal panel 26) is attached to a predetermined end face of the prism 23 with adhesive.

In STEP 13, the prism 23 is slid along the joint surface between the prism 23 and the prism 22 to adjust the liquid crystal panel 26 to a predetermined focal position. The adjustment is performed by adjusting the prism in the directions represented by arrows S in FIG. 4.

In STEP 14, the liquid crystal panel 26 is rotated on the end face of prism 23 to adjust its horizontal and vertical directions relative to a reference axis C. This rotation adjustment is performed by adjusting panel 26 in the directions represented by arrows α in FIG. 4 around axis C indicated by the long-and-short dashed line.

In STEP 15, the liquid crystal panel 26 is shifted on the end face to adjust its center to a reference position by adjusting in the X and Y directions represented by arrows X and Y in FIG. 4.

In STEP 16, the liquid crystal panel 26 is fixed to the prism 23, and the prism 23 is fixed to the prism 22 using a method such as that described for step 4.

In STEP 17, the color composition prism 20 is annealed.

By adjusting the positions of the liquid crystal panels with the steps described above, relative positions of the liquid crystal panels can be adjusted to a predetermined position. The predetermined position described herein includes a position where pixels of the liquid crystal panels are completely matched, and a position where pixels of a predetermined size are shifted (so-called pixel shifting).

In this embodiment, the liquid crystal panels and the prisms are fixed after adjusting their positions. However, the prisms may be fixed after adjusting the positions of the liquid crystal panels. Such adjustment can be effected by projecting an image onto a screen with the prisms incorporated into the projection apparatus shown in FIG. 2 and checking the projected image. However, in order to take full advantage of the single-piece construction property of the color composition prism 20, the color composition prism 20 is preferably taken out of the projection apparatus so as to be adjusted as a unit.

Figure 5:
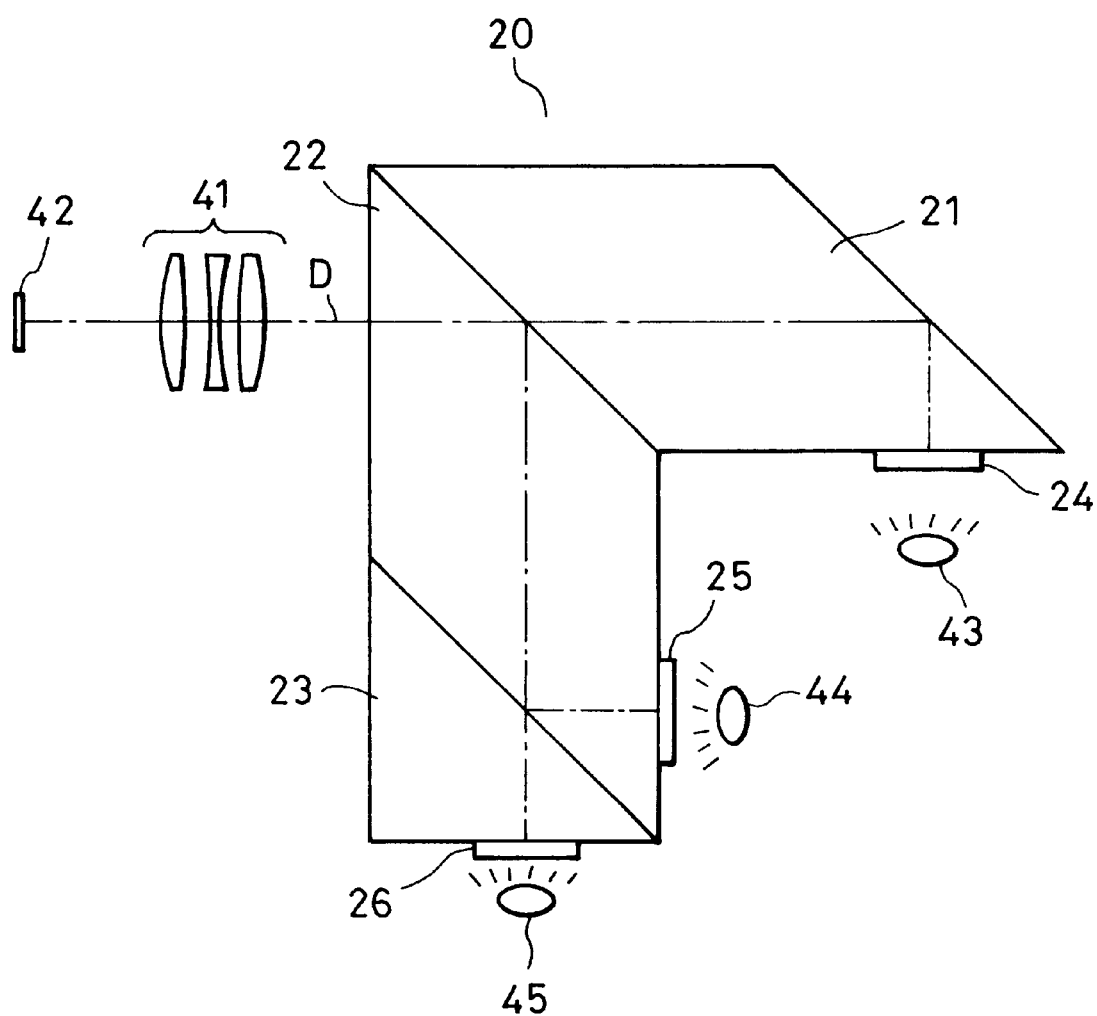
FIG. 5 illustrates an embodiment of an adjustment apparatus in which a color composition prism is adjusted as a unit.

FIG. 5 illustrates an embodiment of an adjustment apparatus in which the color composition prism 20 is adjusted as a unit.

Referring to FIG. 5, the same components as those of FIG. 2 are indicated by the same reference numerals. A position detecting element 42 such as a charge coupled device (CCD) detects the position of the liquid crystal. An adjustment-projection lens 41 projects liquid crystal panels 24 to 26 on the position detecting element 42. Back lights 43, 44 and 45 are provided at the back of the liquid crystal panels.

The positions of the liquid crystal panels can be selectively adjusted by turning on or turning off the back lights. This will be described below in detail.

Figure 8:
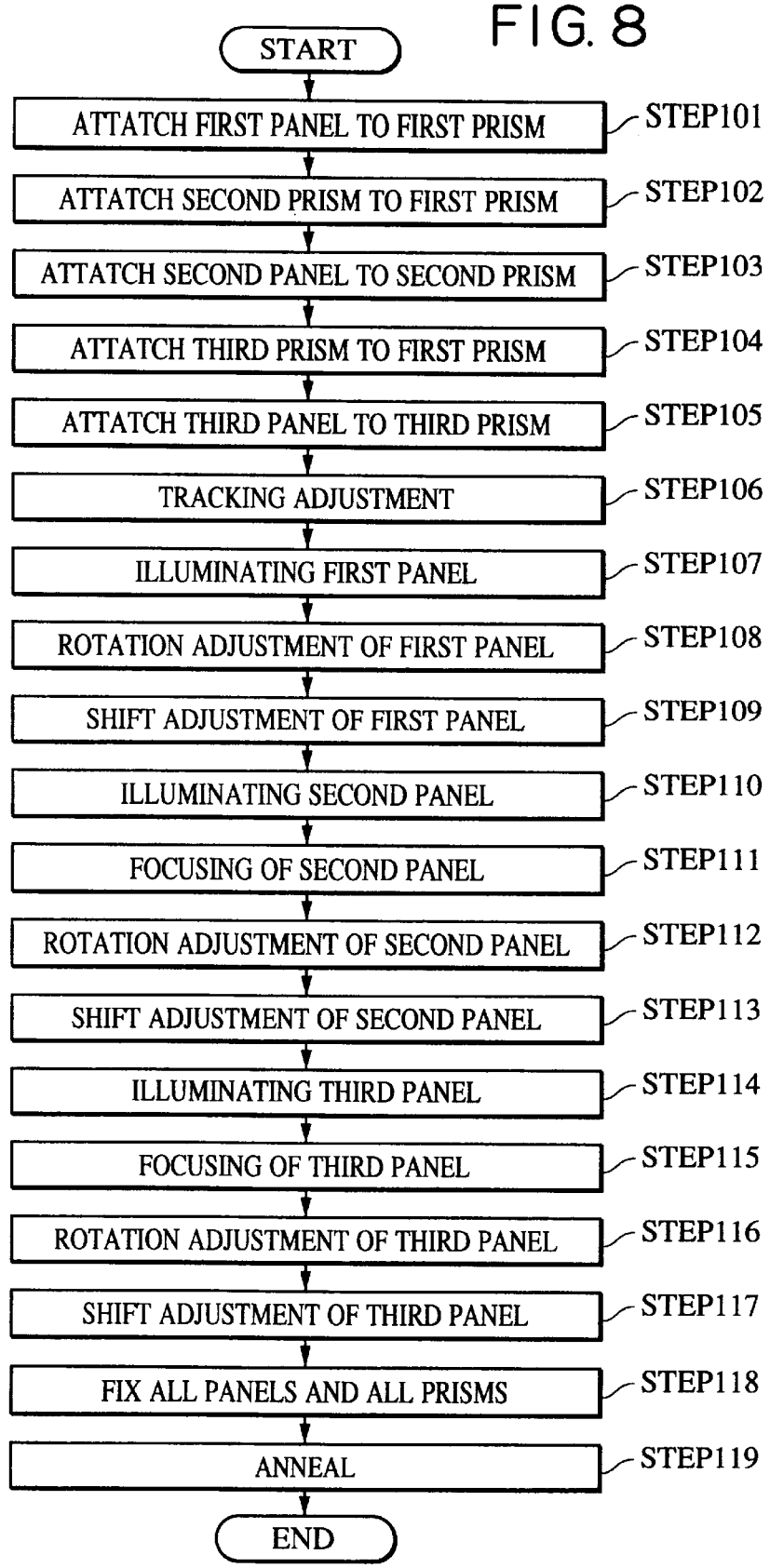
FIG. 8 is a flowchart showing the steps to adjust in another embodiment shown in FIG. 5.

FIG. 8 is a flowchart in this embodiment.

In STEP 101 to 105, each liquid crystal panel 24, 25, 26 and each prism 21, 22, 23 is attached to each end face of a relative prism.

In STEP 106, an operation of moving the adjustment-projection lens 41 along the optical axis D to adjust the focal point of the liquid crystal panel 25 to the position detecting element 42 is performed (tracking adjustment). STEP 106 may be carried out immediately after attaching the liquid crystal panel 25 to the prism 22, i.e., immediately after STEP 101.

In STEP 107, the back light 44 is turned on (back lights 43 and 45 are turned off), then liquid crystal panel 25 is illuminated.

In STEP 108, the liquid crystal panel 25 is rotated to adjust its directions, such as STEP 2 shown in FIG. 3.

In STEP 109, the liquid crystal panel 25 is shifted to adjust a position, such as STEP 3 shown in FIG. 3.

In STEP 110, the back light 43 is turned on (back lights 44 and 45 are turned off), then liquid crystal panel 24 is illuminated.

In STEP 111, the prism 21 is slid along the joint surface to adjust a focal position, such as STEP 7 shown in FIG. 3.

In STEP 112, the liquid crystal panel 24 is rotated to adjust its directions, such as STEP 8 shown in FIG. 3.

In STEP 113, the liquid crystal panel 24 is shifted to adjust a position, such as STEP 9 shown in FIG. 3.

In STEP 114, the back light 45 is turned on (back lights 43 and 44 are turned off), then liquid crystal panel 26 is illuminated.

In STEP 115, the prism 23 is slid along the joint surface to adjust a focal position, such as STEP 13 shown in FIG. 3.

In STEP 116, the liquid crystal panel 26 is rotated to adjust its directions, such as STEP 14 shown in FIG. 3.

In STEP 117, the liquid crystal panel 26 is shifted to adjust a position, such as STEP 15 shown in FIG. 3.

In STEP 118, all liquid crystal panels and all prisms are fixed using a method such as that described for STEP 4 shown in FIG. 3.

In STEP 119, the color composition prism 20 is annealed.

This allows the liquid crystal panels of the three colors of red, green, and blue to be adjusted sequentially. In the method as described above, the color composition prism 20 can be adjusted as a unit.

In the foregoing embodiments, movement of the liquid crystal panels and the prisms may be electrically controlled by remote operation using a robot arm, etc. based on the position information and focal point information electrically detected by the position detecting element, an automatic adjustment apparatus for adjusting and fixing the liquid crystal panels and prisms can be constructed, improving workability and efficiency when manufacturing an optical instrument such as a projector.

Figure 6:
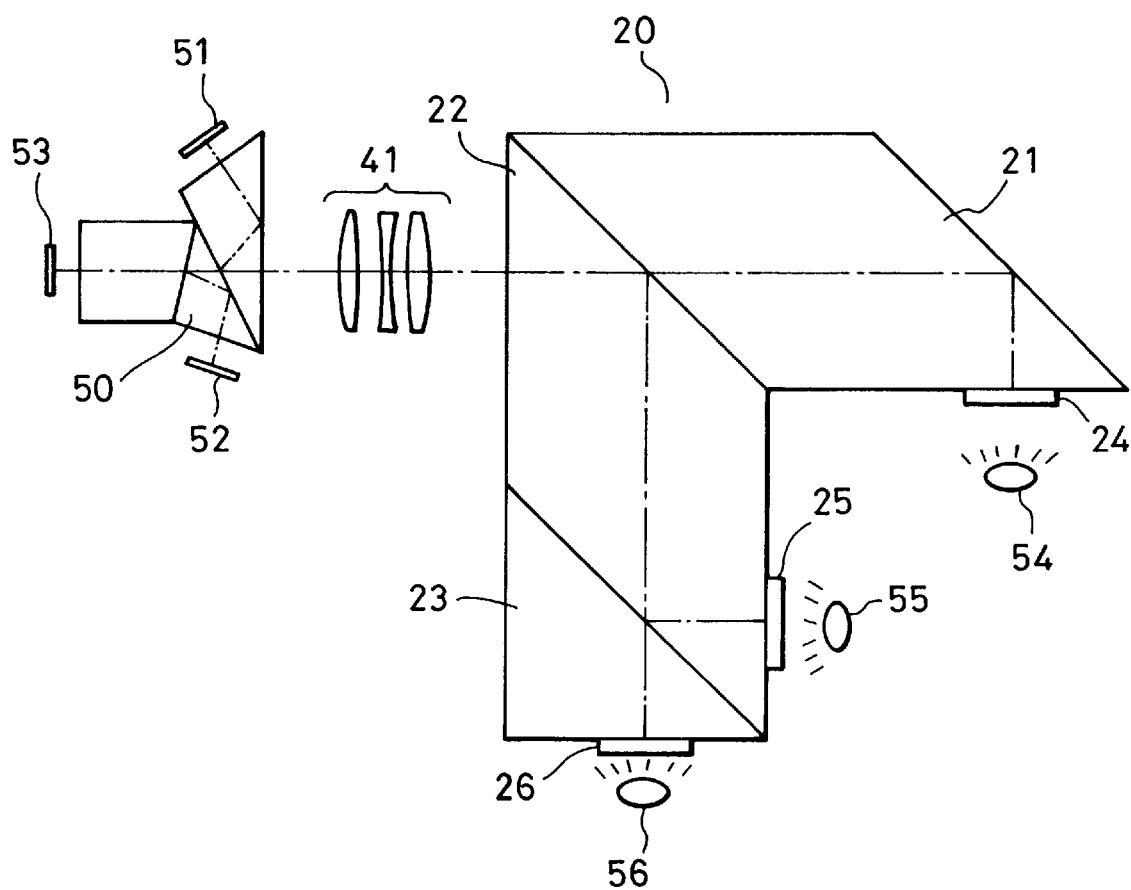
FIG. 6 illustrates another embodiment of the adjustment apparatus shown in FIG. 5.

FIG. 6 illustrates another embodiment of the adjustment apparatus in which a color separation element 50 for separating white light into three colors of red, green and blue is provided at the position where the position detecting element 42 was shown in FIG. 5.

Referring to FIG. 6, there are provided the color separation element 50, position detecting elements 51, 52 and 53 for detecting the position of each liquid crystal panel of each color of red, green and blue, and back lights 54, 55 and 56 for illuminating each liquid crystal panel with each color light of red, green and blue. In FIG. 6, the same components as those of FIGS. 2 and 5 are indicated by the same components.

Figure 9:
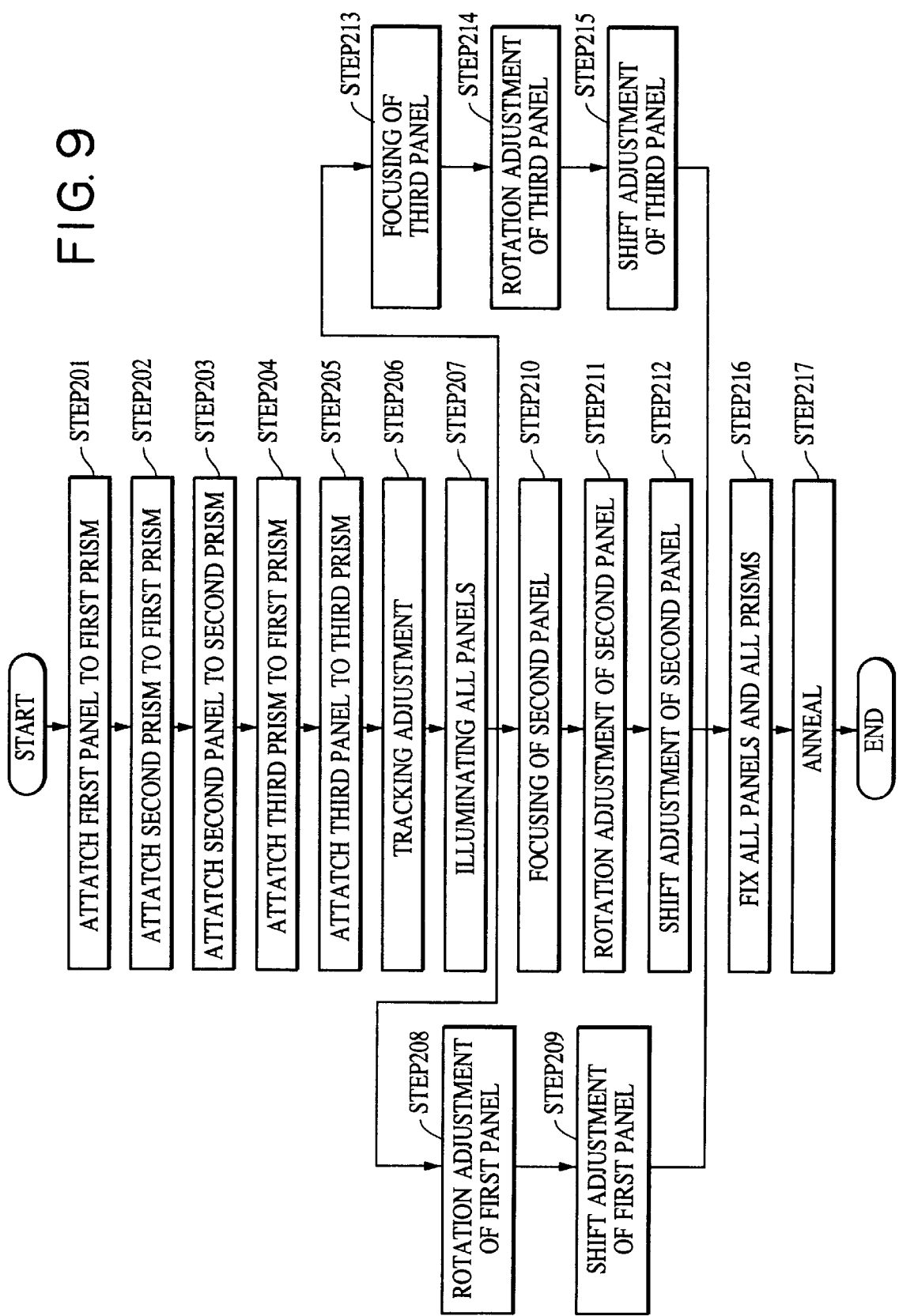
FIG. 9 is a flowchart showing the steps to adjust in another embodiment shown in FIG. 6.

FIG. 9 is a flowchart in this embodiment.

In STEP 201 to 205, each liquid crystal panel 24, 25, 26 and each prism 21, 22, 23 is attached to each end face of a relative prism.

In STEP 206, an operation of moving the adjustment-projection lens 41 along the optical axis D to adjust the focal point of the liquid crystal panel 25 to the position detecting element 53 is performed (tracking adjustment). STEP 206 may be carried out immediately after attaching the liquid crystal panel 25 to the prism 22, i.e., immediately after STEP 201.

In STEP 207, back lights 54, 55, and 56 are turned on, then liquid crystal panels 24, 25, and 26 are illuminated.

In STEP 208, the liquid crystal panel 25 is rotated to adjust its directions, such as STEP 2 shown in FIG. 3.

In STEP 209, the liquid crystal panel 25 is shifted to adjust a position, such as STEP 3 shown in FIG. 3.

In STEP 210, the prism 21 is slid along the joint surface to adjust a focal position, such as STEP 7 shown in FIG. 3.

In STEP 211, the liquid crystal panel 24 is rotated to adjust its directions, such as STEP 8 shown in FIG. 3.

In STEP 212, the liquid crystal panel 24 is shifted to adjust a position, such as STEP 9 shown in FIG. 3.

In STEP 213, the prism 23 is slid along the joint surface to adjust a focal position, such as STEP 13 shown in FIG. 3.

In STEP 214, the liquid crystal panel 26 is rotated to adjust its directions, such as STEP 14 shown in FIG. 3.

In STEP 215, the liquid crystal panel 26 is shifted to adjust a position, such as STEP 15 shown in FIG. 3.

In STEP 216, all liquid crystal panels and all prisms are fixed using a method such as that described for STEP 4 shown in FIG. 3.

In STEP 217, the color composition prism 20 is annealed.

In this flowchart, the flow of STEP 208 to STEP 209, the flow of STEP 210 to STEP 212, and the flow of STEP 213 to STEP 215 are performed simultaneously.

In this embodiment, rotation adjustment, shift adjustment and focusing can be simultaneously and separately effected after the tracking adjustment in accordance with the output of the position detecting element corresponding to each liquid crystal panel. Therefore, this embodiment is most suitable for performing each adjustment automatically with a computer, etc.

Figure 7:
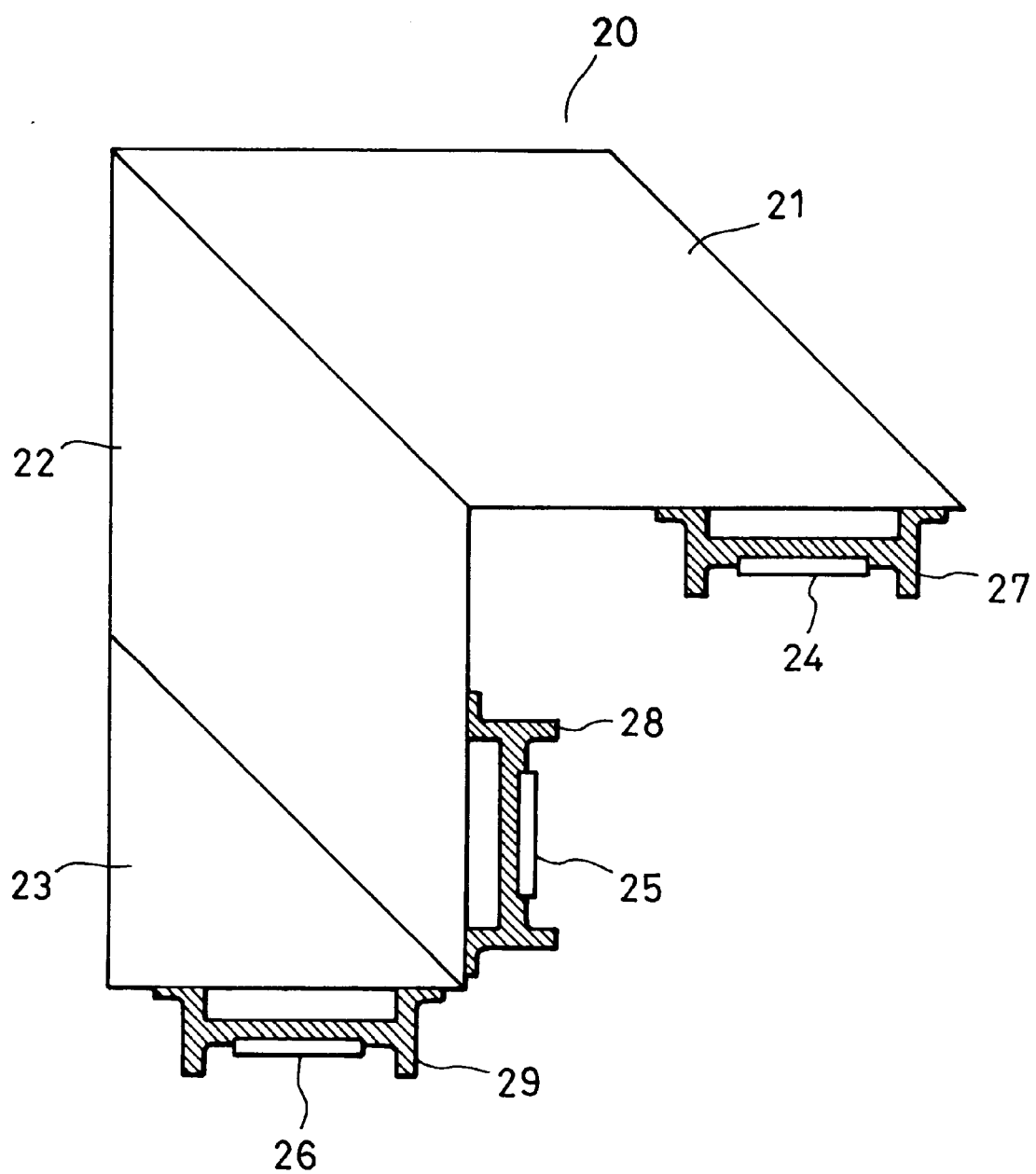
FIG. 7 illustrates an embodiment in which liquid crystal panels are fixed to the color composition prism through relay members.

FIG. 7 illustrates an embodiment in which liquid crystal panels are fixed to the color composition prism 20.

Referring to FIG. 7, there are provided liquid crystal panel holders 27, 28, and 29 as relay members for fixing liquid crystal panels to the color composition prism. In this embodiment, even if the cover glasses of the liquid crystal panels cannot be directly joined to the end face of the prisms, the above-described adjusting method can be effected by using a relay member for fixation such as the liquid crystal panel holder shown in FIG. 7.

As described above, according to the optical member of the present invention, workability when manufacturing an optical instrument such as a projector can be improved.

The individual components shown in the figures are all well-known in the optical arts, and their specific construction and operation are not critical to the operation or best mode for carrying out the invention.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An instrument, comprising:

a white light source;

a color separation optical system for separating light from said white light source into light of each predetermined wavelength range;

a plurality of image forming means which are illuminated by each light of each predetermined wavelength range separated by said color separation optical system;

a color composition optical system for composing each light of predetermined wavelength range emitted from said image forming means; and a projection optical system for projecting the light emitted from said color composition optical system, said color composition optical system comprising a prism member to which said plurality of image forming means are fixed, said prism member comprising a plurality of prisms joined at end surfaces thereof, joint surfaces of said plurality of prisms reflecting therefrom light of a predetermined wavelength range, and passing therethrough light other than light of the predetermined wavelength range, and wherein said prism member is configured so that (a) relative positions of said plurality of prisms are shiftable along the joint surfaces to adjust optical path length of the light emitting from said plurality of image forming means and passing through said prism member in an adjustment mode, and (b) said plurality of prisms are fixed in an operational mode.

2. An optical instrument according to claim 1, wherein in the adjustment mode, adjustment of optical path length of the light emitted from said plurality of image forming means and passing through said prism member includes focusing.

3. An optical instrument according to claim 1, wherein in the adjustment mode, a position of each of said plurality of image forming means is adjusted by at least one of rotation and shifting on said prism member to perform positioning, and in the operational mode, said plurality of image forming means are fixed.

4. An optical instrument according to claim 1, further comprising a plurality of relay members for fixing each of said plurality of image forming means to said prism member.

5. An optical instrument according to claim 1, wherein dichroic films are formed on the joint surfaces of said plurality of prisms.

6. An optical instrument according to claim 1, wherein said plurality of image forming means comprise liquid crystal panels.

7. An optical instrument according to claim 1, wherein said plurality of prisms are fixed with an ultraviolet-curing adhesive.

8. An optical instrument according to claim 1, wherein said plurality of image forming means are fixed with an ultraviolet-curing adhesive.

9. An optical instrument according to claim 1, wherein said prism member has a total of three prisms, and wherein said three prisms are joined at end surfaces thereof.

* * * * *

UNITED STATES PATENT AND TRADEMARK OFFICE
CERTIFICATE OF CORRECTION

PATENT NO. : 6,031,587

DATED : February 29, 2000

INVENTOR(S) : Atsushi OKUYAMA, et al.

Page 1 of 2

It is certified that error appears in the above-identified patent and that said Letters Patent is hereby corrected as shown below:

IN THE DRAWINGS:

SHEET 3 OF 9:

Fig. 3, "ATTATCH" (all occurrences) should read --ATTACH--.

SHEET 8 OF 9:

Fig. 8, "ATTATCH" (all occurrences) should read --ATTACH--.

UNITED STATES PATENT AND TRADEMARK OFFICE
CERTIFICATE OF CORRECTION

PATENT NO. : 6,031,587

DATED : February 29, 2000

INVENTOR(S) : Atsushi OKUYAMA, et al.

It is certified that error appears in the above-identified patent and that said Letters Patent is hereby corrected as shown below:

SHEET 9 OF 9:

Fig. 9, "ATTATCH" (all occurrences) should read --ATTACH--.

Signed and Sealed this

Fifteenth Day of May, 2001

Attest:

NICHOLAS P. GODICI

Attesting Officer   Acting Director of the United States Patent and Trademark Office